United States Patent

Rachfal

[15] 3,651,654
[45] Mar. 28, 1972

[54] CONTROL SYSTEM FOR MULTIPLE STAGE ABSORPTION REFRIGERATION SYSTEM

[72] Inventor: Stanley J. Rachfal, Marcellus, N.Y.
[73] Assignee: Carrier Corporation, Syracuse, N.Y.
[22] Filed: Aug. 10, 1970
[21] Appl. No.: 62,466

[52] U.S. Cl.................................62/103, 62/141, 62/148, 62/476
[51] Int. Cl............................................F25b 15/06
[58] Field of Search.................62/141, 148, 476, 103, 104

[56] References Cited

UNITED STATES PATENTS

| | | | |
|---|---|---|---|
| 3,530,684 | 9/1970 | Porter | 62/148 |
| 3,266,266 | 8/1966 | Reid, Jr. | 62/476 |
| 3,146,604 | 9/1964 | Swearingen | 62/497 X |
| 3,248,891 | 5/1966 | Swearingen | 62/141 X |
| 3,287,928 | 11/1966 | Reid, Jr. | 62/476 X |
| 3,452,551 | 7/1969 | Aronson | 62/148 |

Primary Examiner—William F. O'Dea
Assistant Examiner—P. D. Ferguson
Attorney—Harry G. Martin, Jr. and J. Raymond Curtin

[57] ABSTRACT

A multiple stage absorption refrigeration system is provided with a primary absorber, a primary evaporator, a high pressure generator, a low pressure generator having a high pressure condenser associated therewith and a low pressure condenser connected to provide refrigeration. A centrifugal pump forwards weak solution from the primary absorber to the high pressure generator. Intermediate strength absorbent solution passes through an intermediate solution passage extending between the high pressure generator and the low pressure generator. A steam valve controls heat input to the high pressure generator in response to the leaving chilled water temperature from the evaporator. Improved economy and stability is achieved by a solution valve, in the weak solution passage between the primary absorber and the high pressure generator, which is adjusted in accordance with a sensed level of solution in the intermediate solution passage, so that the quantity of weak solution supplied to the high pressure generator is a function of the difference in pressure between the generators.

4 Claims, 1 Drawing Figure

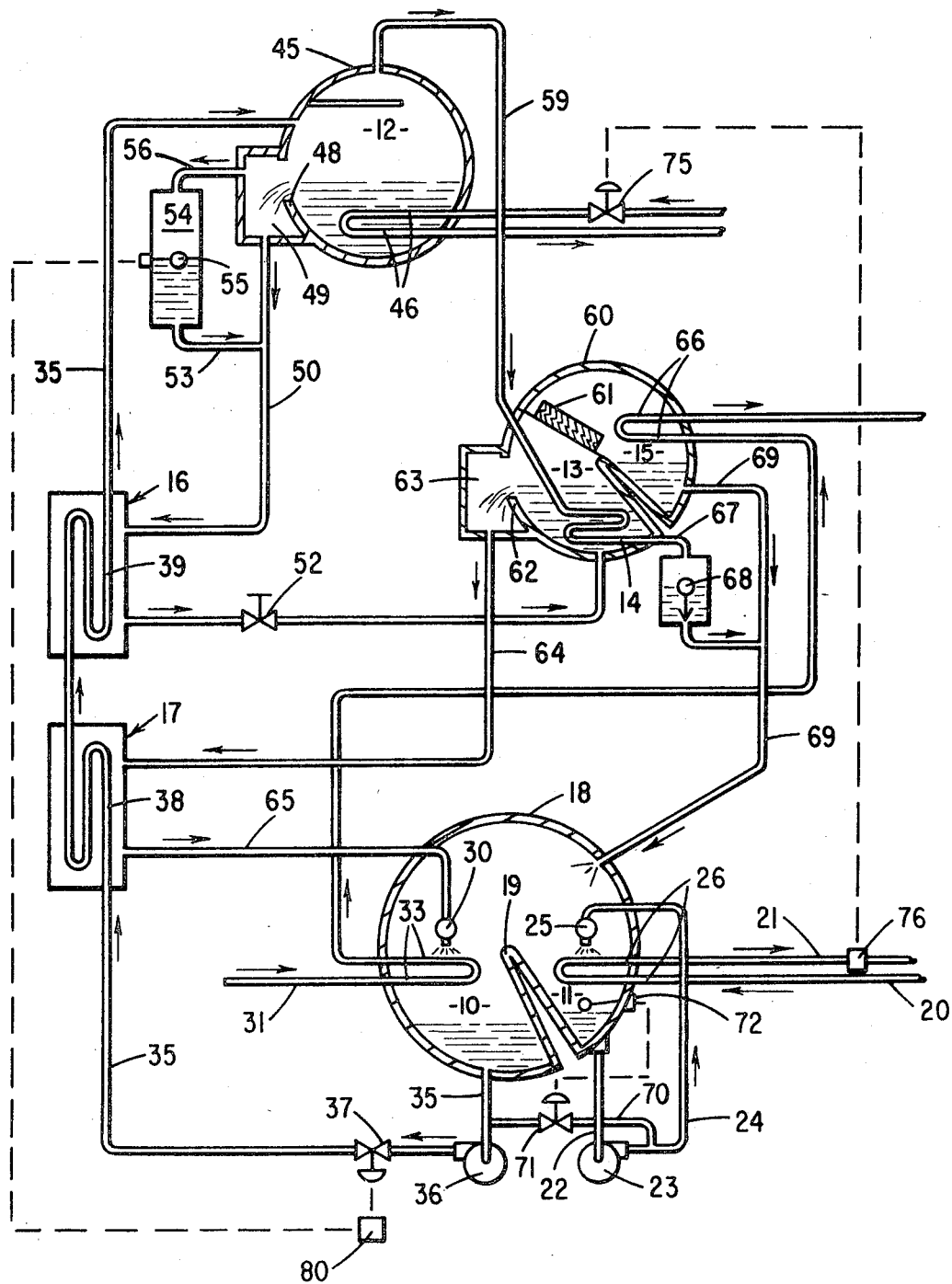

3,651,654

CONTROL SYSTEM FOR MULTIPLE STAGE ABSORPTION REFRIGERATION SYSTEM

BACKGROUND OF THE INVENTION

Multiple stage absorption refrigeration systems are known to have the advantage of more efficiently utilizing heat input to the system and thereby reducing operating economy substantially. However, prior multiple stage absorption refrigeration systems have experienced stability problems during operation because of the relatively wide variations in the high pressure generator pressure relative to the total head of the weak solution pump supplying solution thereto. Centrifugal pumps, which are widely used in such systems, have a relatively flat capacity versus head characteristic. Consequently, relatively small changes in the head imposed on these pumps by the high pressure generator causes a great variation in solution flow to the high pressure generator. The pressure in the high pressure generator necessarily varies widely with changes in condenser cooling water temperature and changes in refrigeration load on the system, which results in variations in input to the generator and corresponding variations generator temperature and pressure. Furthermore, it is frequent practice to utilize a dilution control in such systems to prevent solidification of the absorbent solution. The operation of the dilution control results in diluting the solution which will produce a corresponding drop in pressure in the high pressure generator because of the lowered boiling point of diluted solution.

Accordingly, the rate of delivery of weak solution to the high pressure generator will vary greatly during various conditions of operation of a multiple stage absorption refrigeration system. This variation tends to produce instability in the system because it is possible to flood the high pressure generator and the low pressure generator by excessive solution flow. Flooding the generators results in instability of the system due to contaminating the refrigerant by carryover of absorbent into the condensers, or upsetting the concentration of the strong solution, and possibly reducing the suction head on the weak solution pump to the point that it also becomes unstable or lacks adequate lubrication. It is therefore a feature of this invention to provide a multiple stage absorption refrigeration system having improved stability.

It is also desirable in operating an absorption refrigeration system to reduce the flow of solution to the generator under conditions of lessened refrigeration demand in order to increase the efficiency of the system. However, prior systems for varying solution flow to the high pressure generator have increased the instability problem because of the necessity of their functioning at a time when the high pressure generator is varying in pressure, thereby sometimes resulting in excessively increased solution flow. For example, increasing the solution flow to the high pressure generator will reduce the concentration and the boiling point therein, which in turn may result in a reduction in generator pressure which can cause additional but unwanted solution flow, and the system begins to run away with itself.

Previously, instability problems of multiple stage machines have been approached by attempting to control the discharge pressure of the weak solution pump. This solution is unsatisfactory because a controlled discharge pressure results in widely varying flow conditions at various generator pressures and has required other controls to prevent flooding. Also, such control is inconsistent with attempting to modulate the solution flow in response to load, which is desired for part load efficiency. It is also known to attempt to control the solution flow between the high pressure generator and the low pressure generator but this, in turn, may result in flooding in the system.

SUMMARY OF THE INVENTION

In accordance with this invention, there is provided an improved control system for a multiple stage absorption refrigeration system having two major control features. First, the heat input to the generator is controlled in response to refrigeration demand in order to provide a substantially constant chilled water temperature. Second, the weak solution flow from the absorber to the high pressure generator is controlled in response to the difference in pressure between the high pressure generator and the low pressure generator. The weak solution is controlled in such a manner that when the pressure between the two generators decreases, the flow of weak solution to the high pressure generator is reduced. It has been found that controlling solution flow as an inverse function of the difference in generator pressures provides a desirable solution flow control for efficiency while also improving the stability of the system.

This control is conveniently achieved by providing an intermediate solution passage having a substantially fixed restriction to the flow of intermediate solution from the high pressure generator to the low pressure generator. The fixed restriction presented by the intermediate solution passage results in the transfer of intermediate solution to the low pressure generator at a rate which is proportional to the difference in pressure between the high pressure generator and the low pressure generator. Consequently, this difference in pressure may be sensed by sensing the level of intermediate solution in the intermediate solution passage. The solution flow control valve is therefore preferably regulated in response to the sensed level of intermediate solution in the intermediate solution passage.

BRIEF DESCRIPTION OF THE DRAWING

The drawing schematically illustrates a two-stage absorption refrigeration system having a control system in accordance with this invention.

DESCRIPTION OF THE PREFERRED EMBODIMENT

This invention will be described with reference to a two-stage absorption refrigeration system of the type using water as a refrigerant and an aqueous solution of lithium bromide as an absorbent. Other absorbent and refrigerant combination and other multiple stage machines can be utilized. "Strong solution" as used herein refers to a concentrated solution of lithium bromide which is strong in absorbing power and "weak solution" refers to a dilute solution of absorbent which is weak in absorbing power. "Intermediate solution" refers to a concentration of absorbent which is intermediate in strength between the weak and strong solutions.

The preferred system principally comprises a primary absorber 10, a primary evaporator 11, a high pressure generator 12, a low pressure generator 13 having a high pressure condenser 14 associated therewith, and a low pressure condenser 15, connected to provide refrigeration. A high stage solution heat exchanger 16 and a low stage solution heat exchanger 17 are provided to improve the thermodynamic efficiency of the absorption cycle.

Shell 18 is divided by a partition 19 into primary absorber 10 and primary evaporator 11. Water to be chilled enters evaporator 11 through entering chilled water passage 20 and the cooled water leaves the evaporator through leaving chilled water passage 21. Liquid refrigerant is withdrawn from the bottom of evaporator 11 through passage 22 from which it is pumped by pump 23 through passage 24 and spray header 25 over evaporator heat exchange tubes 26. Refrigerant is vaporized by absorbing heat from the water passing through evaporator heat exchange tubes 26 and the resulting vapor passes to primary absorber 10.

Strong absorbent solution is sprayed over absorber heat exchange tubes 33 through spray header 30. A suitable cooling medium such as water from a cooling tower is passed from cooling medium passage 31 through heat exchange tubes 33 to cool the strong absorbent solution passing over them. The refrigerant vapor formed in evaporator 11 is absorbed into the cooled strong solution in absorber 10 and the resulting weak solution accumulates in a sump in the bottom of the absorber. The accumulated weak solution is pumped from absorber 10 to high pressure generator 12 through a weak solution passage 35 which includes pump 36, solution flow control valve 37, heat exchange tubes 38 and 39 of solution heat exchangers 17 and 16, respectively.

High pressure generator 12 comprises a shell 45 having a plurality of generator heat exchange tubes 46 and an overflow weir 48 which may comprise a wall of shell 45. Weak solution is boiled in high pressure generator 12 by passing steam or other suitable heating medium through generator heat exchange tubes 46 in heat transfer relation with the weak solution. The weak solution is thereby concentrated by vaporizing refrigerant therefrom, and becomes intermediate strength solution. The level of solution in generator 12 is maintained constant by overflow weir 48, and intermediate strength solution spills over weir 48 into intermediate solution chamber 49.

The intermediate solution passes from high pressure generator 12 to low pressure generator 13 through an intermediate solution passage 50 which includes intermediate solution chamber 49, the shell side of high stage solution heat exchanger 16, and a valve or other restriction 52. A manually adjustable valve 52 is illustrated in intermediate solution passage 50, but a fixed orifice restriction device may be utilized or the passage may be sufficiently restricted to maintain desired pressure difference between generator 12 and 13.

The intermediate solution passage preferably presents a substantially fixed restriction to the flow of intermediate solution between high pressure generator 12 and low pressure generator 13. Consequently, the rate of flow of intermediate solution from generator 12 to generator 13 is a function of the difference in pressures therebetween. It is therefore preferred to sense the difference in pressures between the generators by sensing the level of intermediate solution in the intermediate solution passage and desirably in intermediate solution chamber 49. This is achieved by providing a passage 53 communicating with intermediate solution passage 50 and connected to a float level chamber 54 having a suitable float level sensor 55 therein. The top of level chamber 54 is vented to high pressure generator 12 through vent passage 56 so that the level of intermediate solution in float chamber 54 accurately reflects the level of intermediate solution in the intermediate solution passage connecting generators 12 and 13. Shell 60 is divided by a suitable partition and an eliminator assembly 61 into low pressure generator 13 and low pressure condenser 15. Vapor formed in high pressure generator 12 passes through vapor passage 59 and is condensed in the heat exchange tubes of high pressure condenser 14, where it gives up its heat to boil the intermediate solution in generator 13. The refrigerant vaporized from the solution in low pressure generator 13 passes through eliminator 61 and is condensed by heat exchange with the cooling medium passing from absorber heat exchange tube 33 through heat exchange tubes 66 in the low pressure condenser. The condensed refrigerant from high pressure condenser 14 passes through refrigerant passage 67 and float valve 68 into refrigerant passage 69 where it is joined with the refrigerant condensed in low pressure condenser 15. The condensed refrigerant then passes from refrigerant passage 69 into primary evaporator 11 where it passes over evaporator heat exchange tubes 26. The remaining unevaporated liquid refrigerant is collected in the evaporator sump for recirculation over the heat exchange tubes.

The intermediate solution in low pressure generator 13, which is concentrated by vaporizing refrigerant therefrom, to form strong solution which spills over weir 62 into strong solution chamber 63. The strong solution passes through a strong solution passage 64 comprising chamber 63, the shell side of low stage solution heat exchanger 17 and passage 65 through spray header 30 for discharge over absorber heat exchange tubes 33.

A dilution passage 70 having a dilution valve 71 therein is connected between the discharge of refrigerant pump 23 and the inlet of weak solution pump 36. A level control 72 is disposed to sense the level of refrigerant in evaporator 11. In the event that the refrigerant level rises to a point which indicates that the absorber solution is becoming overconcentrated, the dilution valve will open to admit refrigerant into the absorber solution circuit, thereby preventing the absorbent solution from becoming crystalized.

In accordance with this invention, a control system is provided which provides both control of the liquid distribution balance in the system as well as the capacity of the system and at the same time, reduces the solution flow to the high pressure generator in order to increase the efficiency of the machine automatically upon the occurrence of either a reduced refrigeration demand or a reduced cooling water flow to condenser heat exchanger 66 and absorber heat exchanger 33.

The temperature of the chilled water supplied to the refrigeration load through chilled water passage 21 is primarily controlled by regulating the supply of heat to high stage generator 12. In the illustrated system, a steam control valve 75 controls the quantity of steam admitted to generator heat exchange tubes 46. In a direct-fired machine, the capacity may be controlled by varying the supply of fuel to the burners, and in a liquid heated system, the supply of hot liquid may be regulated. A temperature sensing bulb 76 is secured to leaving chilled water line 21 to sense the refrigeration demand imposed on the system. The signal provided by temperature sensor 76 is provided to steam valve 75 to control the position of the steam valve as a direct function of refrigeration demand. The steam valve will open wider upon sensing a rise in chilled water temperature, and vice versa, to maintain a substantially constant chilled water temperature. It will be appreciated that either electric or pneumatic controls and control circuitry of well-known design may be utilized to achieve this function and that the control may include a dead band and feedback circuitry to provide a desired proportional band control characteristic.

When either the chilled water passing through absorber heat exchanger 33 and condenser heat exchanger 66 drops, or when the refrigeration demand imposed on the system is reduced, the thermodynamic efficiency of the refrigeration system may be increased in order to reduce the operating costs. In order to achieve the increased efficiency it is desirable to reduce the quantity of weak solution supplied to high pressure generator 12. For this purpose, solution flow control valve 37 is provided in weak solution passage 35. It is preferred to locate valve 37 in passage 35 between pump 36 and low stage solution heat exchanger 17, particularly if the low stage solution heat exchanger is of other than the sensible type, such as a flash heat exchanger using auxiliary absorbers and evaporators. However, in the illustrated system, utilizing conventional heat exchangers, solution flow control valve 37 may be located at any convenient point in the weak solution passage.

Solution flow control valve 37 is provided with a control circuit 80 which may be of either the electric or pneumatic type to control the position of valve 37 in response to any condition which is a function of the difference in pressure between high pressure generator 12 and low pressure generator 13. In the preferred embodiment, the substantially fixed restriction presented by the intermediate solution passage 49, 50, 16, 51, 52, results in intermediate solution being transferred from generator 12 to generator 13 at a rate which is substantially dependent on the difference in pressures therebetween. Consequently, it is preferred to control the position of valve 37 in response to the level of intermediate solution in the solution passage 50, which is sensed by level sensor 55, and valve 37 is modulated to maintain a constant level of solution in passage 50 to prevent flooding of generator 12.

In operation, assuming the absorption refrigeration system is operating at design full load conditions, solution valve 37 is fully open and steam valve 75 is adjusted to a position which maintains the desired chilled water temperature in passage 21. In the event that the temperature of the cooling water supplied to the system or the refrigeration demand imposed on the system drops, the pressure in high pressure generator 12 will begin to drop. A drop in refrigeration demand will result in a drop in leaving chilled water temperature which, in turn, will cause steam valve 75 to reduce the heat input to the high pressure generator, thereby reducing the pressure therein. Similarly, a drop in cooling water temperature will cause the pressure in primary absorber 10 to drop which will increase the capacity of the absorber and cause a corresponding drop in evaporator temperature. The drop in evaporator temperature will be reflected by a drop in leaving chilled water temperature and steam valve 75 will tend to close, thereby reducing the high stage generator pressure. While the temperature in low pressure generator 13 will also drop, the corresponding reduction in pressure in the low pressure generator will be less than the reduction in pressure in the high pressure generator due to the basic laws governing boiling liquids. Consequently, the difference in pressure between the generators will be reduced at either low loads or low cooling water temperatures. The reduction in pressure between the generators will result in less intermediate solution passing through intermediate solution passage 50 to low pressure generator 13 and the level of solution will begin to rise in intermediate solution chamber 49 or elsewhere in the intermediate solution passage. The rise in intermediate solution level is sensed by solution level sensor 55 which will send a signal to control circuit 80 and adjust solution flow control valve 37 to supply less weak solution to the high stage generator. Since less solution is supplied to the high stage generator, the efficiency of the refrigeration cycle is increased because less work is done to maintain the equilibrium temperature and pressure conditions established by the refrigeration demand on the system. At the same time, instability, due to flooding the high pressure generator is prevented.

Solution flow control valve 37 is preferably of the modulating type which is positioned to maintain a substantially constant intermediate solution level in the intermediate solution passage. However, valve 37 could be of any type providing a plurality of restriction conditions which operates as a direct function of the difference in pressure between the generators or an inverse function of the solution level in the intermediate solution passage, so that a rise in level causes a reduction in solution flow. Various other modifications of this invention may be made such as replacing the solution level sensor 55 with a differential pressure sensor which directly reads the difference in pressures between the generators. It is also possible to use a differential thermostat responsive to the temperature of intermediate solution leaving generator 12 and strong solution leaving generator 13 to obtain a control signal for control circuit 80 which is a function of the difference in pressure between the two generators.

The control system described is capable of regulating the capacity of a multistage system while at the same time, the control of weak solution effectively increases the efficiency of the cycle at low loads and low cooling water temperatures. Furthermore, the fluctuations in the pressure of the high pressure generator which have previously led to instability, because of the tendency of the weak solution pump to overfeed the generator, is effectively utilized as a control feature to prevent overfeeding of the generator and to reduce the solution flow thereto in order to increase the operating efficiency of the system.

While for purposes of illustration a preferred embodiment has been described, it will be understood that this invention may be otherwise embodied within the scope of the following claims.

I claim:

1. A multiple stage absorption refrigeration system comprising:
   A. a primary absorber for absorbing refrigerant vapor into absorbent solution;
   B. a primary evaporator for evaporating refrigerant to provide cooling;
   C. a high pressure generator including heating means for heating absorbent solution therein to concentrate the absorbent solution by vaporizing refrigerant therefrom;
   D. a low pressure generator having a high pressure condenser section associated therewithin;
   E. a low pressure condenser;
   F. weak solution passage means for passing weak absorbent solution from said primary absorber to said high pressure generator for concentration therein;
   G. intermediate solution passage means for passing intermediate strength absorbent solution from said high pressure generator to said low pressure generator for further concentration therein;
   H. strong solution passage means for passing strong absorbent solution from said low pressure generator to said primary absorber for absorption of refrigerant vapor therein;
   I. high pressure refrigerant vapor passage means for passing high pressure refrigerant vapor formed in said high pressure generator through the high pressure condenser section of said low pressure generator for condensing said vapor and heating solution in said low pressure generator;
   J. low pressure refrigerant vapor passage means for passing low pressure refrigerant vapor formed in said low pressure generator to said low pressure condenser for condensing said vapor;
   K. refrigerant liquid passage means for passing condensed refrigerant to said primary evaporator for evaporation herein;
   L. refrigerant vapor passage means for passing evaporated refrigerant from said primary evaporator to said primary absorber for absorption into absorbent solution;
   M. weak solution pump means in said weak solution passage means for pumping absorbent solution from said primary absorber to said high pressure generator;
   wherein the improvement comprises:
   N. means for sensing the refrigeration demand imposed on said system;
   O. heating medium control means associated with said high pressure generator for varying the quantity of heat supplied thereto in response to the sensed refrigeration demand imposed on said system;
   P. said intermediate solution passage comprising a substantially fixed unvarying restriction to flow of intermediate solution to said low pressure generator under all conditions of operation of the system;
   Q. means for sensing the difference in pressure between said high pressure generator and said low pressure generator; and
   R. solution flow control valve means in said weak solution passage for varying the quantity of weak solution supplied to said high pressure generator in response to the sensed difference in pressure between said high pressure generator and said low pressure generator, so as to reduce the quantity of weak solution supplied to high pressure generator as the pressure difference between the high pressure generator and the low pressure generator is reduced.

2. A multiple stage absorption refrigeration system as defined in claim 1:
   A. weir means for maintaining a substantially uniform level of solution in said high pressure generator;
   B. said means for sensing the difference in pressure between said high pressure generator and said low pressure generator comprising level sensing means for sensing the level of intermediate solution in said intermediate solution passage; and
   C. control means for adjusting said solution flow control valve means to provide a rate of flow of weak solution from said primary absorber to said high pressure generator as an inverse function of the sensed level of intermediate solution in said intermediate solution passage.

3. In a method of producing refrigeration from an absorption refrigeration system having a primary absorber, a high pressure generator, a low pressure generator having a high pressure condenser associated therewith, a low pressure condenser, a primary evaporator, and a weak solution pump operatively connected to provide refrigeration, the steps comprising:

A. pumping weak solution from the primary absorber to the high pressure generator;
B. supplying heat to the high pressure generator to concentrate weak absorbent solution therein by vaporizing refrigerant from the weak solution to form intermediate solution;
C. condensing in the high pressure condenser refrigerant vapor formed in the high pressure generator to further concentrate intermediate solution in the low pressure generator by vaporizing additional refrigerant therefrom to form strong solution;
D. condensing refrigerant vapor formed in the low pressure generator in the low pressure condenser;
E. evaporating condensed refrigerant in the primary evaporator to provide refrigeration;
F. absorbing in the primary absorber refrigerant vapor formed in the primary evaporator into strong solution formed in the low pressure generator;

wherein the improvement comprises:

G. regulating the quantity of heat supplied to the high pressure generator in accordance with the refrigeration demand on said system;
H. regulating the quantity of weak solution supplied to the high pressure generator in accordance with a direct function of the difference in pressure between said high pressure generator and said low pressure generator; and
I. passing intermediate strength solution through an unregulated fixed restriction from the high pressure generator to the low pressure generator under all conditions of operation of the system.

4. A method of producing refrigeration as defined in claim 3 including the step of maintaining a substantially constant level of solution in said high pressure generator; and wherein the step of regulating the quantity of weak solution supplied to the low pressure generator includes the step of sensing the level of intermediate solution in an intermediate solution passage extending between said high pressure generator; and regulating the flow of weak solution to the high pressure generator as an inverse function of the sensed intermediate solution level.

* * * * *